United States Patent
McElroy

[15] 3,666,979
[45] May 30, 1972

[54] FOCUSED PIEZOELECTRIC TRANSDUCER AND METHOD OF MAKING

[72] Inventor: Jerry T. McElroy, Boulder, Colo.

[73] Assignee: Automation Industries, Inc., Century City, Los Angeles County, Calif.

[22] Filed: June 17, 1970

[21] Appl. No.: 46,897

[52] U.S. Cl. .............................. 310/9.6, 73/67.7, 73/71.5, 310/9.4, 310/9.5, 29/25.35
[51] Int. Cl. .............................. H04r 17/00, G01n 29/04
[58] Field of Search .................... 73/71.5, 67.8; 310/8.7, 9.6, 310/9.5, 8.2, 8.3, 9.1; 29/25.35, 594

[56] References Cited
UNITED STATES PATENTS

| | | | |
|---|---|---|---|
| 3,233,449 | 2/1966 | Harmon | 73/67.8 |
| 2,803,129 | 8/1957 | Bradfield | 73/67.8 |
| 3,242,552 | 3/1966 | Cowan | 29/25.35 |

Primary Examiner—Richard C. Queisser
Assistant Examiner—John P. Beauchamp
Attorney—Dan R. Sadler

[57] ABSTRACT

An apparatus and method for fabricating focused high frequency electromechanical transducers especially useful in ultrasonic inspection apparatus is disclosed. An initially flat or planar piezoelectric crystal is placed between a pair of members having mating surfaces contoured to correspond to the desired shape of the crystal. When the members are forced together the crystal is bent or otherwise formed into the desired shape.

11 Claims, 4 Drawing Figures

Patented May 30, 1972 3,666,979
2 Sheets-Sheet 1
Fig. 1.
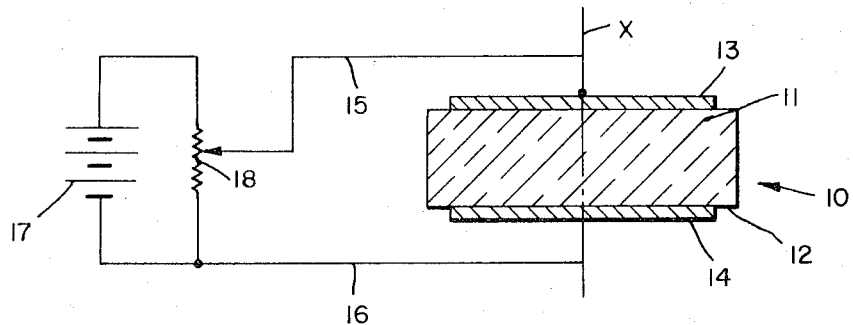
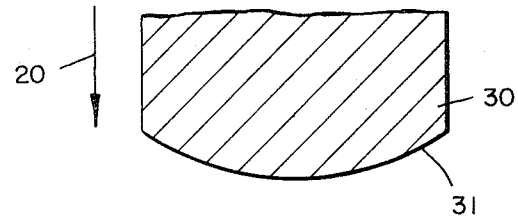
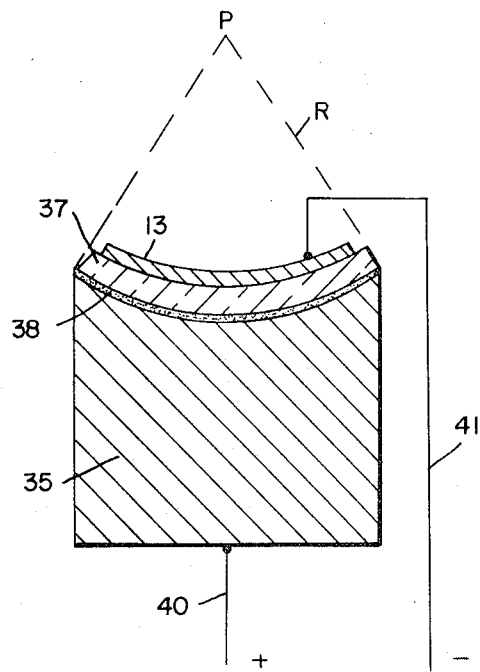
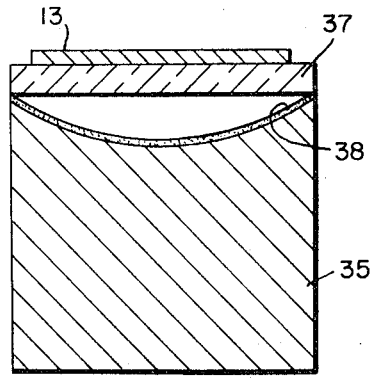
Fig. 3.
Fig. 2.
Jerry T. McElroy,
INVENTOR.
BY.
ATTORNEY.

Jerry T. McElroy,
INVENTOR.

FOCUSED PIEZOELECTRIC TRANSDUCER AND METHOD OF MAKING

BACKGROUND

This invention relates to electromechanical transducers, the fabrication and use thereof, and, more particularly, to new and improved ultrasonic transducers for transmitting and/or receiving focused ultrasonic energy having high frequencies.

In one form of nondestructive testing, ultrasonic energy is transmitted into and/or received from a workpiece. By determining the interreaction of the ultrasonic energy with the workpiece the physical characteristics of the workpiece can be determined. In the so-called pulse echo form of ultrasonic testing a short, high frequency, electrical pulse is applied to a transducer. The electrical pulse causes the transducer to vibrate and radiate a pulse of ultrasonic frequency. Conversely ultrasonic energy incident upon the transducer results in the generation of an electrical signal.

The ultrasonic energy is typically coupled to a workpiece to be tested through a suitable intervening couplant. The ultrasonic energy travels through the workpiece under test and is redirected by the surfaces thereof as well as by any discontinuities which may be present in the workpiece. The redirected energy may be received by the original or transmitting transducer or a separate receiving transducer.

The resultant electrical signal from the transducer is coupled to suitable utilizing means for indicating the characteristics of the workpiece. For example, the electrical signals may be coupled to a display device such as a cathode ray tube. The resultant display may provide a visual indication of the depth, position, size, location, etc. of a discontinuity.

In order to improve the resolution accuracy, etc. of an ultrasonic nondestructive testing system it is highly desirable to employ ultrasonic energy of a very high frequency. The frequency at which the crystal transducer vibrates is a function of its physical dimensions. As a result, as the frequency of the ultrasonic energy increases the thickness of crystal decreases. Since piezoelectric materials are very brittle and frangible, when the frequency is in a region above a few megacycles the crystal is so thin it become very delicate and fragile. This in turn makes the crystal extremely difficult to handle, particularly during manufacturing.

Also to improve the resolution and accuracy it is highly desirable for the crystal to only move or vibrate in accordance with the applied electrical signal. However, because of the inherent characteristics of the crystal even though the electrical signal may comprise only a unipolar "half cycle" the crystal will "ring" or continue to vibrate for a considerable period of time after the termination of the electrical signal. In order to overcome these difficulties it has been customary to apply some form of mechanical dampening to the backside of the crystal.

To further improve the resolution and accuracy it is desirable to focus the ultrasonic energy into a beam having preselected characteristics. One means of accomplishing this is to use acoustic lenses in front of the transducers. Although acoustic lenses are capable of focusing the beam, they have not proven satisfactory at the higher frequencies for several reasons, for example the higher frequency filtering affects of such lenses, etc.

Another means of obtaining a focused beam of ultrasonic energy is to either cast or grind the piezoelectric crystal into the desired shape. However, this has also proven unsuccessful. This is particularly true with crystal transducers intended for use at high frequency applications where the crystal must inherently be very thin.

SUMMARY

The present invention provides means for overcoming the foregoing difficulties. More particularly the present invention provides a novel ultrasonic transducer particularly useful in ultrasonic testing apparatus and the like and a method and apparatus for fabricating high frequency, focused transducers.

In the embodiment of the invention disclosed herein, means are provided for forming a transducer such as a piezoelectric crystal into a shape which is inherently effective to radiate a focused beam of ultrasonic energy and is inherently self dampened. This is accomplished by forming (for example by lapping, etc.) a crystal blank into a thin, flat section suitable for a crystal transducer to be used at the intended frequency. The thin crystal transducer is positioned between a pair of members having surfaces thereon contoured to correspond to the final desired shape. The two members are then forced together so as to cause the crystal to be bent or otherwise formed into the desired shape. If desired, one of the members may be a permanent backing member. In this event an adhesive or bonding material is provided on the contoured surface and/or the crystal transducer whereby the backside of the transducer is permanently retained in intimate engagement with the member.

It has been found that even though the crystal transducer may be very thin and otherwise quite fragile the compensating stresses introduced into the crystal transducer during its forming prevents it from disintergrating. In addition, the resultant stressed configuration of the crystal transducer apparently is effective to materially improve the "Q" of the crystal transducer and thereby insure a high degree of oscillatory dampening.

BRIEF DESCRIPTION OF THE DRAWINGS

FIG. 1 is a diagrammatic view of an apparatus embodying one form of the present invention and particularly adapted for fabricating improved ultrasonic crystal transducers;

FIG. 2 is a diagrammatic view of an apparatus which may be employed to practice a further advanced step in the production of the improved crystal transducers;

FIG. 3 is a view of an ultrasonic search unit employing a crystal transducer embodying one form of the present invention.

DETAILED DESCRIPTION OF THE DRAWINGS

Figure 4:
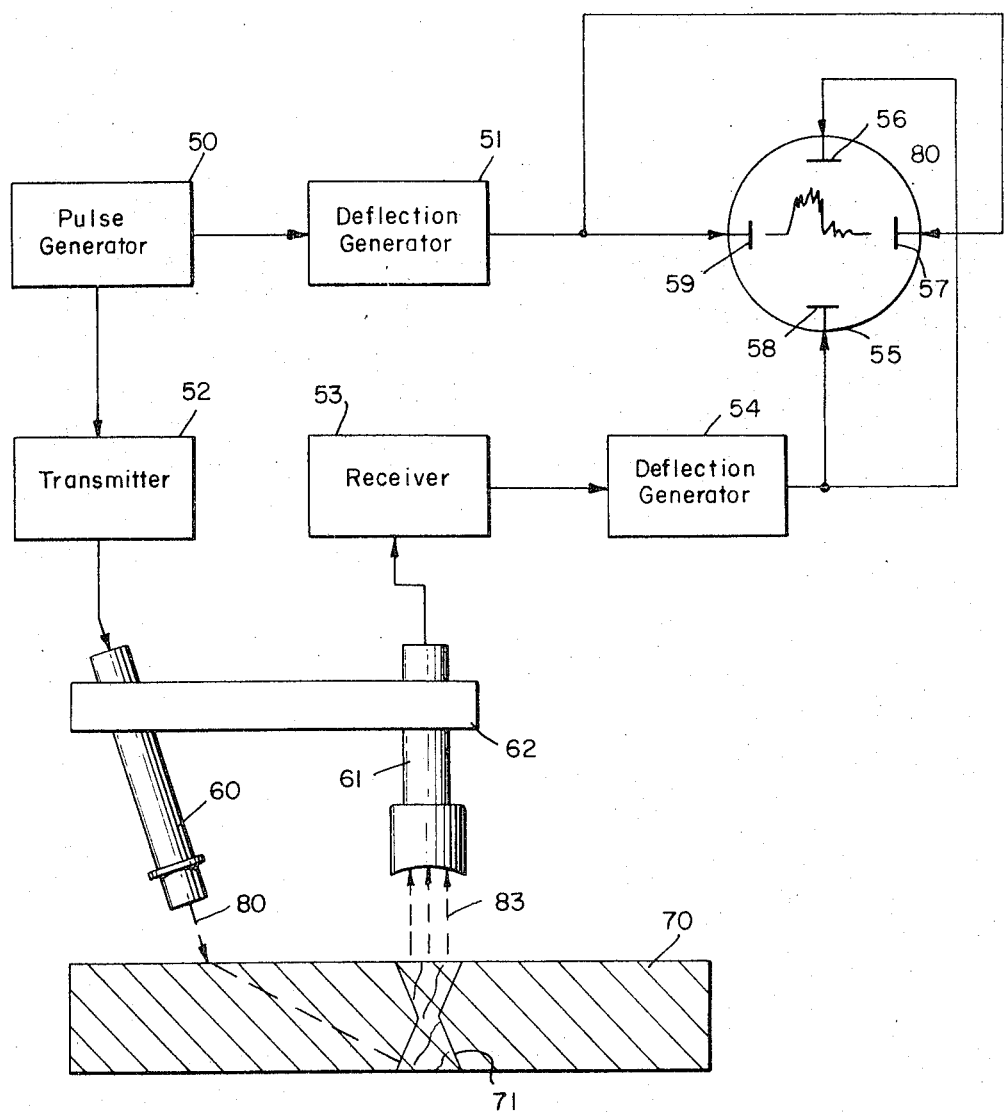
FIG. 4 is a block diagram of an ultrasonic test system incorporating the improved transducer of the present invention.

Referring to the drawings in more detail the present invention is particularly adapted to be embodied in a novel crystal transducer and a method for forming the same. Initially a crystal blank 10 of a polarizable, piezoelectric material, such as lead zirconate or barium titanate is provided. A pair of parallel surfaces 11 and 12 are formed perpendicular to the "X" axis. Normally the thickness of the blank 10, i.e. the space between the surfaces 11 and 12 is considerably greater than the thickness of the finished crystal transducer.

At this point it is desirable to polarize the material in the blank 10 for the desired mode of vibration. Although the polarization may be accomplished in any desired manner in the present instance a pair of electrodes 13 and 14 are applied to the two surfaces 13 and 14. The electrodes 13 and 14 are normally relatively thin layers of silver.

A source of polarizing potential such as a battery 17 and potentiometer 18 are coupled to the electrodes 13 and 14 by the electrical connectors 15 and 16. The blank 10 is now polarized by the application of a suitable potential from sources such as a battery 17 and potentiometer 18. The blank 10 is preferably maintained at an elevated temperature in a region of about 400°C during at least a portion of the polarization cycle.

After the blank 10 is adequately polarized the temperature of the blank 10 is appropriately reduced and the connections 15 and 16 are removed.

Although the blank 10 may be polarized in any desired manner for any desired mode of operation in the present instance it is polarized along the "X" axis for operation in the thickness-expander mode.

After polarization, the thickness of the piezoelectric blank 10 may be reduced down to the desired amount by any well-known technique such as lapping.

The lapping operation may be continued until the thickness of the blank 10 is reduced to the final thickness of the crystal transducer 37. This final thickness usually depends upon the operating frequency at which the crystal transducer 37 is intended to operate. For example if the transducer 37 is intended to operate in the region of 20 mcs it will be provided with a thickness of about 0.005 inches.

The lapping operation inherently removes at least one of the electrodes. The other electrode may be left on the unlapped surface. After the crystal transducer 37 is reduced to the desired thickness it may or may not be desirable to apply a second electrode 14' to the just lapped surface 12'. The crystal transducer 37 is then positioned upon a forming member 35 having a contoured surface. The contour of the surface is selected to correspond to a shape of the crystal transducer 37 which will produce the desired focusing, etc. Although this contour may be concave or convex, cylindrical, parabolic, etc. in the present instance it is concave and substantially spherical.

The end of a ram 30 is positioned adjacent the contoured surface on the member 35. The end of the ram 30 has a surface 31 which is contoured to compliment the surface of the member 35. The ram 30 is adapted to have a force applied thereto whereby it will be advanced in the direction of the arrow 20.

The end surface 31 is effective to engage the electrode 13 and/or the surface 11 of the crystal transducer 37. As the ram advances in the direction of the arrow 20 the thin crystal transducer 37 is forced into the cavity on the end of the member 35.

Piezoelectric materials which are normally employed for ultrasonic transducers (for example materials such as lead zirconate, barium titanate, etc.) are very brittle, frangible, etc. As a result these crystals are normally considered to be very delicate, requiring very careful handling in order to avoid breakage. However, in spite of these characteristics of the crystal transducers, it is possible to bend or otherwise deform the transducer 37 over a sufficient range to obtain a considerable amount of focusing. By way of example, it has been found the crystal transducer 37 may be formed into a spherical shape with a minimum amount of breakage when the radius of the sphere is at least six times greater than the diameter of the transducer 37.

After the crystal transducer 37 is formed into the desired shape it may be secured to a suitable backing member. The crystal transducer 37 may be initially shaped upon a separate forming member and then secured to a second member. However, it has been found advantageous for the forming member 35 to be a permanent backing member. In this event a film 38 of a bonding material such as an epoxy adhesive may be provided on the surface of the backing member 35 either during the forming of the crystal transducer 37 or as a subsequent operation. At any rate when this film 38 has cured the crystal transducer 37 is securely and permanently bonded to the backing member 35.

The backing member is preferably fabricated from a suitable acoustic dampening material. This is effective to absorb the acoustic energy radiated and/or reflected, etc. from the back surface 12. This backing member may be similar to that disclosed and claimed in U.S. Pat. No. 2,972,068.

It has also been found desirable for the backing member 35 to be electrically conductive. By way of example, it may be a casting epoxy resin which is at least partially loaded with lead, tungsten, etc. In this event the bonding material 38 is electrically conductive.

It is to be noted that when the crystal transducer 37 is deformed and bonded in this deformed condition there will be a large amount of internal stress in the transducer 37. These stresses are believed to be effective in greatly improving the "Q" of the crystal transducer 37. More particularly, it is believed these internal stresses materially interfere with the physical movements of the crystal and cause the vibrations therein to be rapidly dissipated. This means that if a signal is applied to the crystal transducer 37 whereby it is made to vibrate it will rapidly return to its quiescent state in an extremely short interval of time.

A pair of electrical leads 40 and 41, FIG. 3, may be connected to the electrode 13 and the electrically conductive backing member 35 or the electrode 14' if it is present. This entire arrangement may then be sealed into a suitable search unit 60.

The search unit 60 may be incorporated into an ultrasonic test system such as shown in FIG. 4 for inspecting materials such as a workpiece 70. A pulse generator 50 provides high frequency signals to a transmitter 52. The pulse generator 50 normally determines the pulse repetition rate of signals produced by the transmitter 52. The signals from the transmitter 52 are applied to the electrodes 13 and 14' of the crystal transducer 37 in search unit 60. The transducer 37 is physically deformed in response to the electrical signals and radiates corresponding ultrasonic energy. Since the surface of the transducer 37 is contoured the energy is focused into a beam 80 of the desired shape.

The ultrasonic energy in the beam 80 is incident upon the workpiece and propagates into and/or through the workpiece. When the energy is incident upon a discontinuity such as one of the surfaces of workpiece 70 or a defect 71 therein at least a portion of the energy is returned to the search unit 60 and/or to a second search unit 61.

When the returning ultrasonic energy is incident upon the crystal transducer 37 or the transducer in the search unit 61 a corresponding electrical signal is generated. The electrical output signals from search unit 61 are applied to a receiver 53. It should be noted that although two search units are shown the crystal transducer 37 is reciprocal and may be used as a transmitter and/or a receiver. The signals from receiver 53 are then applied to a deflection generator 54 which applies them to the vertical deflection plates 56 and 58 of a cathode ray tube 55, for example.

The horizontal time base for the cathode ray tube 55 is provided by a deflection generator 51 which is initiated by the pulse generator 50 upon generation of the initial impulses. The deflection signal is applied to the horizontal deflection plates 59 and 57 on the cathode ray tube 55. The cathode ray tube, therefore, shows vertical deflections on a horizontal time base on the display 80.

What is claimed is:

1. A method of forming a focused ultrasonic transducer including the steps of:
    positioning a ceramic piezoelectric element that is in solid form upon a surface having a contour corresponding to the desired final shape of the transducer;
    forming said element while it is in said solid form around said surface into said final shape; and
    retaining said element in said shape.

2. The method of claim 1 wherein the steps of forming said element into said shape creates a stress state in said element and retaining said element in said shape includes bonding said element onto a backing member and maintaining said element in the stressed state.

3. A method of forming a focused electromechanical transducer including the steps of:
    providing a ceramic piezoelectric blank having a pair of parallel flat surfaces;
    polarizing said piezoelectric blank;
    lapping at least one of said surfaces to reduce the thickness of the blank to the desired thickness of the transducer;
    positioning the lapped blank on a mounting member having a surface with a contour corresponding to the desired contour of the transducer;
    applying an adhesive material between the surface of the mounting member and the blank; and
    pressing the blank against the surface of the mounting member and bonding the blank to the mounting member.

4. The method of claim 3 wherein the step of pressing the blank against the top surface of the mounting member includes the steps of:

positioning a ram member, having a surface corresponding to the surface on the mounting member in engagement with the blank; and forcing the surface of the ram against the blank whereby the blank is forced against the surface of the mounting member.

5. The process of forming a focused piezoelectric crystal by positioning a substantially flat thin ceramic piezoelectric crystal, having first and second spaced parallel surfaces, on a mounting member having a contoured mounting surface adjacent said second crystal surface;

applying an adhesive material into the area between said second crystal surface and said mounting surface; and applying pressure to said first crystal surface to force said second crystal surface into intimate engagement with said mounting surfaces, said pressure being applied for a sufficient time to allow said adhesive to hold said crystal in the bent condition.

6. The process of claim 5 wherein the last named step comprises the steps of:

positioning a ram member, having a convex surface substantially matching the radius of curvature of the concave holding member surface, adjacent said first crystal surface; and forceably engaging said first crystal surface with the convex ram surface to force said second crystal surface into intimate engagement with the concave mounting surface.

7. A focused electromechanical transducer comprising:

a mounting member having a curved mounting surface;

a thin ceramic piezoelectric crystal having first and second spaced substantially parallel surfaces with the second surface being in intimate engagement with said curved mounting surface, said first crystal surface being in a state of compression and said second crystal surface being in a state of tension; and means for holding said second crystal surface in intimate engagement with said curved mounting surface.

8. The transducer of claim 7 wherein said stressed piezoelectric crystal is spherical in configuration having a center of curvature substantially defining a point.

9. The transducer of claim 7 wherein said stressed piezoelectric crystal is cylindrical in configuration having a center of curvature substantially defining a line.

10. The transducer of claim 7 wherein said holding means comprises a cement material interposed between said mounting surface and said second crystal surface.

11. The transducer of claim 10 further comprising a thin conductive layer positioned on said first crystal surface.

* * * * *